April 18, 1933.     N. H. GAY     1,904,785
LIQUID LEVEL GAUGE FOR VOLATILE LIQUIDS
Filed March 29, 1932     2 Sheets-Sheet 1
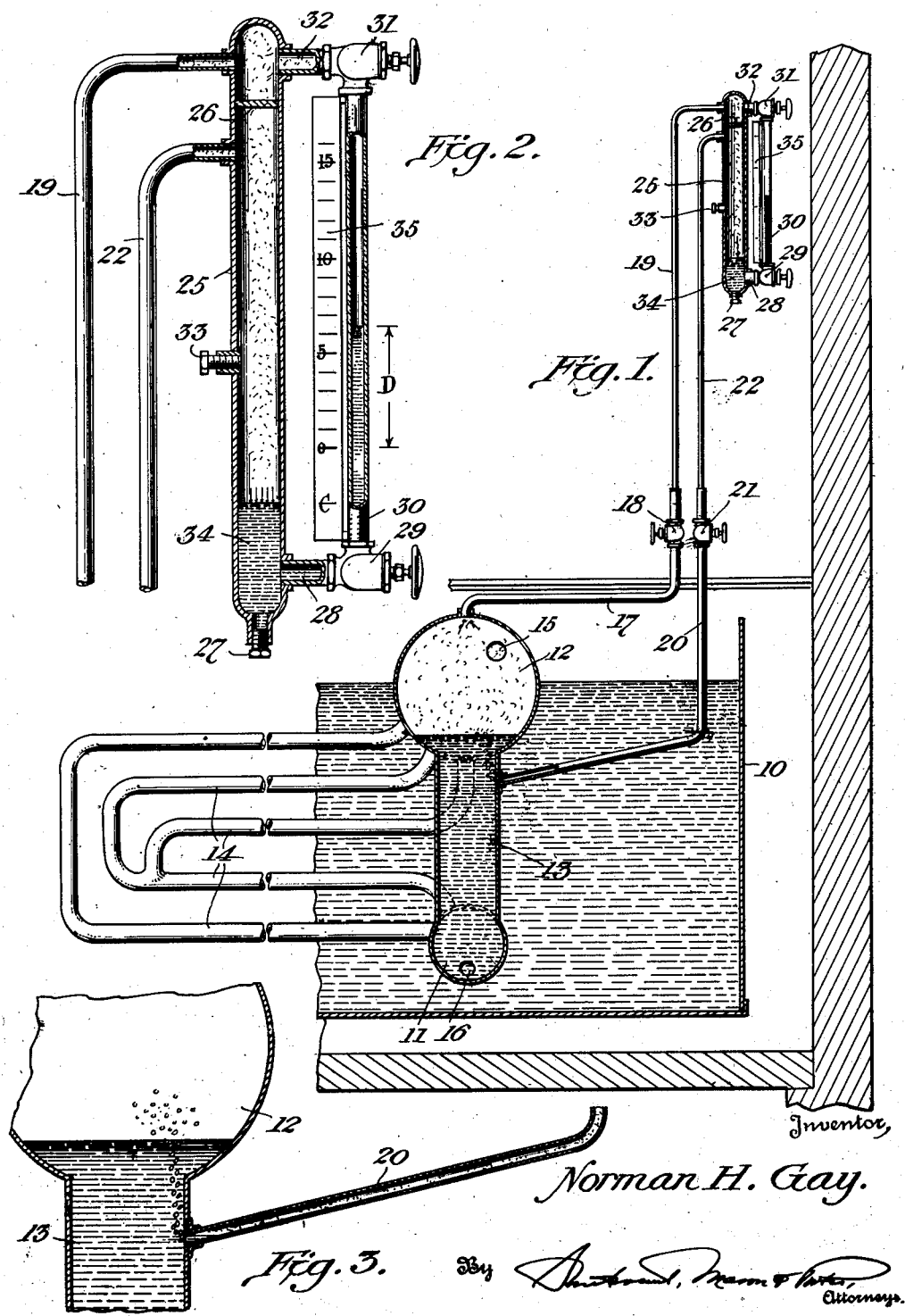
Inventor,
Norman H. Gay.

April 18, 1933. N. H. GAY 1,904,785
LIQUID LEVEL GAUGE FOR VOLATILE LIQUIDS
Filed March 29, 1932 2 Sheets-Sheet 2
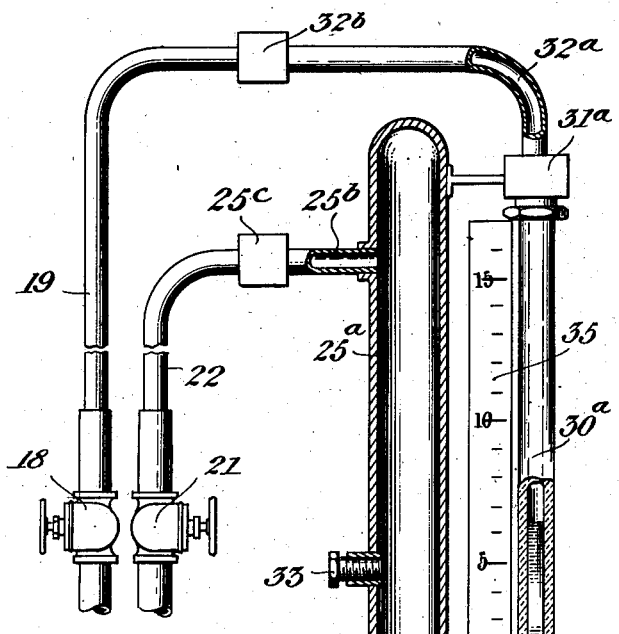
Fig.5.
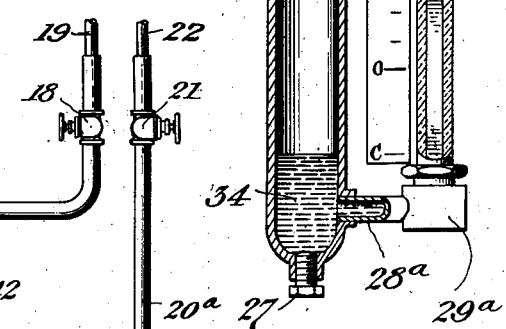
Fig.4.
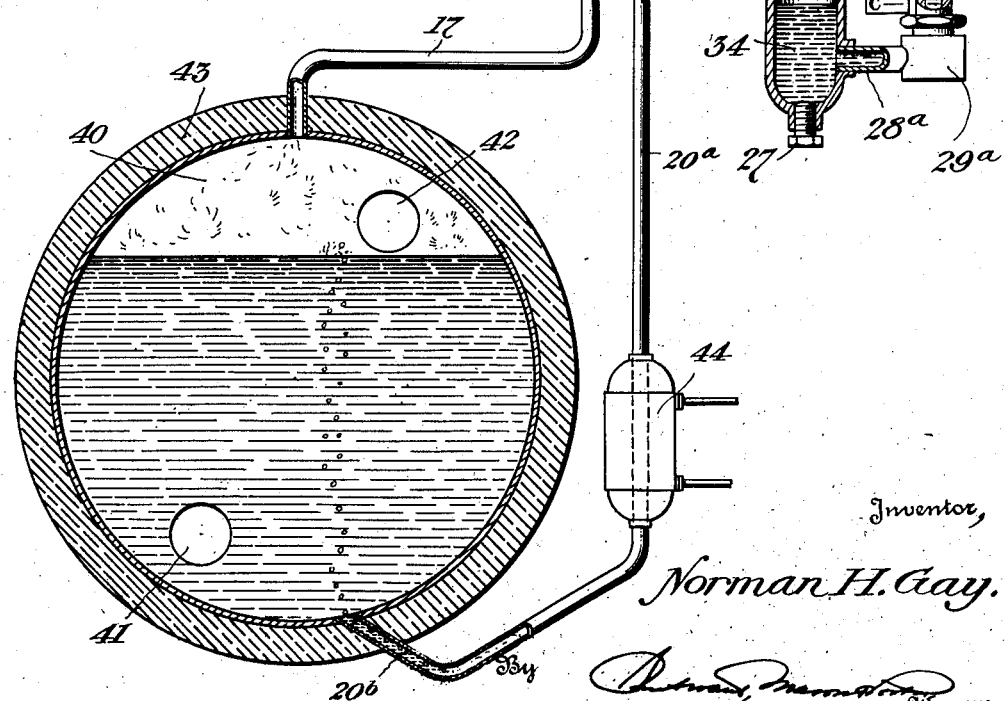
Inventor,
Norman H. Gay.

Patented Apr. 18, 1933

1,904,785

UNITED STATES PATENT OFFICE

NORMAN H. GAY, OF LOS ANGELES, CALIFORNIA

LIQUID LEVEL GAUGE FOR VOLATILE LIQUIDS

Application filed March 29, 1932. Serial No. 601,827.

The present invention relates to liquid level gauges for measuring depths of volatile liquids, and being particularly adapted to a remote indication of levels of refrigerant liquid existing in a refrigerating system.

One of the objects of the present invention is to provide a remotely indicating liquid level gauging system in which the vaporization of the liquid itself is employed for de10 riving an indication of a prevailing level of the same in a vessel.

Another feature of the present invention is a liquid level gauge which is fully automatic and requires no external power or supervision during its use.

A further object of the invention is to provide a liquid level gauge which operates under static conditions of the liquid supply in a vessel without requiring any movement of the liquid or of parts of the gauging system.

With these and other objects in view as will appear in the course of the following specification and claims, illustrative forms of practicing the invention are set forth on the ac25 companying drawings, in which:

Figure 1 is a vertical sectional view showing the relationship of the gauging system and a vessel containing a volatile liquid, illustrated as being the evaporator structure of the refrigerating system.

Figure 2 is a view, on a larger scale, showing the arrangement of the gauging indicator.

Figure 3 is a view, on a larger scale than that of Figure 1, showing the relationship of a vapor pressure tube to the vessel of which the contents are being indicated.

Figure 4 is a view corresponding to a portion of Figure 1, showing the connection to the receiver and employing an external source of heat.

Figure 5 is a view corresponding to Figure 2, but showing a modified form of construction.

In the form shown in Figure 1, a brine tank 10 is provided, having located therein a bottom inlet header 11 and an upper outlet header 12 which are connected by a liquid refrigerant return column 13 and by a plurality of refrigerating coils 14 which pass from the inlet to the outlet header. In a manner well known in the art, such a system operates by the passage of liquid refrigerant from the inlet header 11 through coils 14, in which the liquid refrigerant vaporizes in part so that the density of the commingled liquid and gaseous refrigerant is less than that of the liquid refrigerant in the connecting column 13, so that there is a constant flow and circulation of liquid refrigerant from the inlet header 11, through the coils 14, to the outlet header 12 where the liquid is separated and returns through the conduit 13 back to the inlet header 11 again. The vaporized refrigerant is drawn off for example through a pipe 15 for recompression and condensation, and returned by a supply conduit 16, through any suitable expansion valve (not shown).

In the form shown, it is desired to indicate at all times the level of liquid existing in the outlet header 12. For this purpose a vapor balancing conduit 17 is in communication with the outlet header 12 at its top, and may be closed by the shut off valve 18. Above the valve 18 it is continued as a small conduit 19 which may be of flexible nature, so that it may conform to other apparatus and to the walls of the building.

Likewise, from a point below the lowest liquid level which it is desired to indicate, a second or vapor pressure conduit 20 extends from communication with the column 13 (Figure 1) to the shut off valve 21, and thence by an extension conduit 22, which also may be flexible, to the indicator system.

In Figure 2, the indicator system is shown to comprise a vertical tube 25 which is closed at its upper end and has a partition 26 adjacent the upper end, and is normally closed by a screw plug 27 at its lower end. A branch connection 28 leads from near the lower end of tube 25 to a shut off valve 29 above which is mounted the transparent indicating tube or gauge glass 30 which preferably is of much smaller internal diameter than the internal diameter of the tube 25. The upper end of the tube 30 is in communication through the shut off valve 31 with a branch connection 32 which opens into the tube 25 above the partition 26. The vapor balancing conduit 19 opens into the space of tube 25 above the partition 26, while the vapor pressure conduit 22 opens into tube 25 close beneath the partition 26. It is preferred to provide a further plug member 33 for establishing an initial balance in the system, and for filling the system with the desired quantity of indicating liquid. This indicating liquid forms a pool 34 in tube 25 and hence, for example, when conduits 19 and 22 are disconnected, a like liquid level is established in tubes 25 and 30 (which together form a U-tube), which is adjusted so that the level in tube 30 comes opposite the "C" mark on the indicating scale 35.

The operation of this structure is as follows:

If the plant is empty of liquid refrigerant, and then a supply thereof is built up in the refrigerating plant, the admission of liquid refrigerant through the conduit 16 causes its level to rise into connecting column 13, for example to the level shown in Figure 1. As the liquid rises above the mouth of conduit 20, a part of this liquid passes into the conduit 20 and thus rises, in the form shown in Figure 1, substantially to liquid level in header 12. Thus the gas or vapor present in conduits 20 and 22 and vertical tube 25 below the partition 26 is partially compressed. Since the brine contained in the brine tank 10 is warmer than the liquid in conduit 20, vaporization will take place in this liquid in conduit 20 and the vapor or gas thus formed will rise and leave the liquid in conduit 20 and cause an increase in pressure above the liquid level in conduit 20. As this pressure increases in conduit 20 it will depress the liquid level in conduit 20 until such time as the liquid level reaches the point at which conduit 20 joins the connecting column 13, substantially as shown in Figure 3. When this level is attained, any additional increase in pressure in conduit 20 will cause bubbles to escape into column 13 as illustrated in Figure 3. This pressure in conduit 20 is communicated through conduit 22 to tube 25 and is imposed upon the surface of the indicating liquid 34. Since the vapor space of the outlet header 12 is in communication by conduits 17, 19 with the top of the column of liquid in tube 30, while the pressure conduits 20, 22 are in communication with the top of the column of liquid in tube 25, the movement of the column of indicating liquid is controlled by the actual rise of liquid level above the mouth of conduit 20, and this is indicated by the rise in column 30 as shown in Figure 2, above the "C" point of the scale 35.

Point "O" on scale 35 would correspond to the lowest liquid level in header 12, which it is desired to indicate, for example, the bottom of the header. Rise "D" would then indicate the height of liquid in header 12 above this point.

This condition continues so long as there is a static liquid level in the header 12. If the compressor is started and gas is evacuated through the outlet pipe 15, the suction through conduits 17, 19, and upon the liquid in the header 12 and column 13, and thus upon conduits 20, 22 balances, and unless there is a change of the liquid level, no change of indication occurs.

If the liquid level in the header 12 rises, the increased hydrostatic pressure produced thereby prevents the discharge of vapor from conduit 20 until greater pressure exists therein, this pressure being transmitted through conduit 22 and tube 25 and the pool of liquid 34, and thus the column of liquid in tube 30 is caused to rise and thus to remain in correspondence with the actual liquid level in the header 12.

If the liquid level in header 12 drops, it is easier for gas to escape from the conduit 20, and the pressure therein falls, and thus at the same time also the column of liquid in tube 30.

It is preferred to provide for the liquid in pool 34 and in tube 30 a material which is substantially nonabsorptive of the refrigerant vapor, or at least one which has an absorption varying but slightly within the pressure limits corresponding to the hydrostatic pressure of liquid to be measured. It has been found in practice that the lubricating oil employed in refrigerating plants is excellently adapted for the purpose.

It is obvious that the invention may be employed in other ways. In Figure 4, the invention is shown as employed with a container 40 having an inlet 42 for liquid refrigerant and a discharge 41 for the same. The conduit 17 is connected as before to the high point in the container 40, while conduit 20a is connected to a bottom point thereof. Since this container may be provided with a heat insulating jacket 43, the conduit end 20b is brought out through this jacket, and may be exposed to the air of the room so that it is warmed to develop vapor pressure therein. It is also possible to create this vapor pressure by employing a heater device as by a steam or hot water jacket 44. In this form of construction it will be noted that conduit 20a has its end 20b directed upwardly, so that the discharge of gas from conduit 20a occurs at the lowest point of the top wall of the conduit 20b (i. e. below the bottom of the container 40 itself), and hence by connecting the conduits 17, 20a to the indicator shown in Fig. 2, the indicator will give readings for any liquid level in the container 40, from entirely empty to entirely full.

In Fig. 5 is shown a modified form of indicator corresponding to that shown in Fig. 2. In this form the conduits 19, 22 are not connected to the same tube 25, with the interposition of the partition 26. In lieu thereof the tube 25 has an extension 25b upon which is mounted a ball check valve 25c. The glass tube 30a is mounted by a stuffing box 29a upon the branch 28a of tube 25a. An upper stuffing box 31a closes the upper end of tube 30a and places it in communication with the conduit 32a having a ball check 32b therein for establishing communication with conduit 19. A scale 35 is provided as before. The operation of this structure is the same as before.

By closing valves 18 and 21, the indicator portion of the system may be separated from the conduits 17 and 20 which are connected to the vessel whose liquid level is being indicated.

It will be noted that in each form of the invention the pressure conduit 20, 22 is exposed for at least a portion of its length to the action of the medium having a temperature above the vaporizing point of the liquid whose level is being indicated. In Fig. 1 this is accomplished by the exposure of conduits 20 and 22 to the brine in tank 10 and to the atmosphere of the room. In Fig. 4, the conduit 20a is exposed to the atmosphere in the room, and also may be provided with a separate heater 44. This heater is illustrated as being below the indicated liquid level so that it may heat a portion of the tube 20a into which liquid might enter. When the liquid level falls below the bottom of the heater, heating may yet occur by conduction along the tube, so that heat is transmitted to the liquid: and at all events the vapor present in conduits 20a and 22 is being heated. It will be seen that the accuracy of the indication is not changed by any trapping of gas in one or the other conduit, nor by any heating or cooling of liquid or gas in either conduit.

The valves 29, 31 and 25c, 32b are employed to prevent the escape of refrigerant vapor from the indicating system if the gauge glass 30 or 30a is broken.

It is obvious that other modifications and applications may be made in the practice of the invention, without departing from the scope of the appended claims.

Having thus described the invention, what I claim as new and desire to secure by Letters Patent, is:

1. A liquid level indicator for a vessel containing a volatile liquid, comprising a U-tube containing an indicating liquid, a balancing conduit for connecting the top of one leg of the U-tube to the top of the vessel, and a pressure conduit for connecting the top of the other leg of the U-tube to the vessel at a point not higher than the minimum level to be indicated, said pressure conduit being exposed for at least a part of its length to a temperature above the vaporizing point of said volatile liquid.

2. An indicator as in claim 1, in which the pressure conduit has a portion extending below the minimum level to be indicated, and said portion is exposed to a temperature above the vaporizing point of said volatile liquid.

3. A liquid level indicator for a refrigerating system having an upper outlet and a lower inlet header with a connecting column and evaporation coils, comprising a U-tube containing an indicating liquid, a balancing conduit for connecting the top of the outlet header to the top of one leg of the U-tube, a pressure conduit for connecting the top of the other leg of the U-tube to the header and column assembly at a point not higher than the bottom of the outlet header, said pressure conduit being exposed for at least a part of its length to a temperature above the vaporizing point of the refrigerant liquid.

4. An indicator as in claim 3, in which a brine tank surrounds the evaporating coils, and said pressure conduit is exposed to the brine in said tank for at least at part of its length.

5. A liquid level indicator for a vessel containing a volatile liquid, comprising a U-tube containing an indicating liquid, a balancing conduit for connecting the top of one leg of the U-tube to the top of the vessel, a pressure conduit for connecting the top of the other leg of the U-tube to the vessel at a point not higher than the minimum level to be indicated, and a heater for bringing a portion of the pressure conduit to a temperature above the vaporizing point of said liquid.

6. A liquid level indicator for a vessel containing a volatile liquid, comprising a U-tube containing an indicating liquid, a balancing conduit for connecting the top of one leg of the U-tube to the top of the vessel, a pressure conduit for connecting the top of the other leg of the U-tube to the vessel at a point not higher than the minimum level to be indicated, whereby liquid may enter the pressure conduit from said vessel, and means for heating liquid in the pressure conduit to a temperature above the vaporizing point of said liquid.

7. A liquid level indicator for a vessel containing a volatile liquid, comprising a U-tube containing an indicating liquid, and a pressure conduit for connecting the top of one leg of the U-tube to said vessel at a point not higher than the minimum level to be indicated, a portion of the pressure conduit being exposed to a temperature above the vaporizing point of said liquid.

8. A liquid level indicator for a vessel containing a volatile liquid, comprising a vertically disposed tube, a gauge tube communicating at its top and bottom with said first vertical tube, a partition in said first vertical tube between said gauge connections, and means controlled by the liquid head in said vessel for varying the pressure difference at the opposite sides of said partition.

In testimony whereof, I affix my signature.

NORMAN H. GAY.